United States Patent [19]
Lupton et al.

[11] Patent Number: 6,030,507
[45] Date of Patent: Feb. 29, 2000

[54] PROCESS FOR MAKING A CRYSTALLINE SOLID-SOLUTION POWDER WITH LOW ELECTRICAL RESISTANCE

[75] Inventors: David Francis Lupton, Gelnhausen; Jörg Schielke, Bruchköbel; Marek Gorywoda, Hanau, all of Germany; Bernard Serole, Peyrins, France; Friedhold Schölz, Rodenbach, Germany

[73] Assignee: W.C. Heraeus GmbH & Co. KG, Germany

[21] Appl. No.: 09/078,947

[22] Filed: May 14, 1998

[30] Foreign Application Priority Data

May 23, 1997 [DE] Germany .......................... 197 21 649

[51] Int. Cl.[7] .............................. C01G 19/00; H01B 1/08; C01B 13/32

[52] U.S. Cl. ............... 204/164; 204/192.15; 204/192.29; 204/298.13; 204/298.12; 501/126; 501/134; 419/23; 419/25; 419/31; 419/42; 419/49; 423/624; 423/115; 423/593; 420/129; 420/555; 420/590; 428/697; 428/701; 428/702

[58] Field of Search ......................... 204/192.15, 192.29, 204/164, 298.13, 298.12; 501/126, 134; 419/23, 25, 31, 42, 49; 423/624, 115, 593; 420/129, 555, 590; 428/697, 701, 702

[56] References Cited

U.S. PATENT DOCUMENTS

| | | | |
|---|---|---|---|
| 4,701,301 | 10/1987 | Kuwahara et al. . | |
| 5,071,800 | 12/1991 | Iwamoto et al. | 204/192.29 |
| 5,401,701 | 3/1995 | Ogawa et al. | 501/134 |
| 5,580,641 | 12/1996 | Haynes | 428/195 |
| 5,723,027 | 3/1998 | Serole . | |
| 5,762,768 | 6/1998 | Goy et al. | 204/298.13 |
| 5,866,493 | 2/1999 | Lee et al. | 501/134 |

FOREIGN PATENT DOCUMENTS

| | | |
|---|---|---|
| 0 386 932 | 9/1990 | European Pat. Off. . |
| 0 467 194 | 1/1992 | European Pat. Off. . |
| 195 40 379 C1 | 9/1996 | Germany . |
| 19540379 C1 | 9/1996 | Germany . |

OTHER PUBLICATIONS

Hoffman, et al, Appl. Phys., 16, pp. 239–246 (month unknown), 1978.

Buchanan et al., Thin Solid Films, 80, pp. 373–382 (month unknown), 1981.

Patent Abstracts of Japan, vol. 017, No. 086, Feb. 19, 1998 of JP 04 281840 A dated Oct. 7, 1992.

S.J. Wen et al., Journal of Solid State Chemistry 101, 203–210 (1992), "Electrical Properties of Pure $In_2O_3$ and Sn—Doped $In_2O_3$ Single Crystals and Ceramics" (month unknown).

*Primary Examiner*—Alan Diamond
*Attorney, Agent, or Firm*—Frishauf, Holtz, Goodman, Langer & Chick, P.C.

[57] ABSTRACT

A process for making a crystalline solid-solution powder which involves reacting at least two reactants in a plasma arc of a plasma chamber and blast-cooling the resultant product in a high velocity gas stream to form the powder. The first reactant is a molten metal alloy and the second reactant is a gas. The reaction is carried out in a plasma arc and the products rapidly cooled by a gas stream acting at the outlet opening of the plasma chamber. The crystalline solid-solution powder formed by the process has a low electrical resistivity. If an indium-tin alloy is used as the first reactant and oxygen as the second reactant, there is obtained an indium-tin-oxide (ITO) crystalline solid-solution powder which, when compacted to 40% of its theoretical density, has an electrical resistivity in the range of about 2 Ωcm. This ITO crystalline solid-solution powder is particularly suitable for preparing an ITO target, with high electrical conductivity and thus high achievable sputtering rates.

8 Claims, 2 Drawing Sheets

PROCESS FOR MAKING A CRYSTALLINE SOLID-SOLUTION POWDER WITH LOW ELECTRICAL RESISTANCE

BACKGROUND

The invention relates to a process for making a crystalline solid-solution powder with a low electrical resistance by reacting at least two reactants at high temperatures and then rapidly cooling the reaction product in a high speed gas stream. The reaction is accomplished in a plasma arc of a plasma chamber provided with an inlet opening for the reactants and an outlet opening with a gas-supply unit to obtain a molten material, wherein a molten metal or alloy is used as the first reactant and a gas as the second reactant. The invention also relates to a crystalline solid-solution powder made thereby, especially an indium-tin-oxide crystalline solid-solution powder and the use thereof, especially as an ITO sputtering or vacuum coating target for preparing low electrical resistance thin films.

Several processes for making crystalline solid-solution powders are known. In numerous publications, special interest is focussed on indium-tin-oxide (ITO) powders, which are used for ITO sputtering targets, and on the production thereof. In this connection, high electrical conductivity of the target is regarded as a desirable feature because it allows achieving high sputtering rates with ITO targets. The high electrical conductivity of the target is substantially determined by the electrical resistivity of the ITO powder used for making the target by means of sintering. Similarly, a highly conductive coating formed using an ITO paste needs an ITO powder with correspondingly low electrical resistance.

EP 386 932 A1 discloses a process for making an ITO powder by thermal decomposition of concentrated mixed salts of indium and tin acetates. By means of this complex process, ITO powders having special properties relative to their particle characteristics are obtained. Such powders are further processed to targets with which ITO films can be obtained in vacuum-coating (sputtering) systems. EP 386 932 also provides data on the electrical conductivity of these ITO films, but not on the electrical conductivity or electrical resistance of the ITO powder or on the process parameters which influence this property.

Another chemical process for making ITO powders is by precipitating and then calcining indium hydroxide from an indium nitrate solution and tin hydroxide or hydrated tin oxide from an Sn chloride solution. However, quantitative data on the electrical resistivity of these or the above-mentioned ITO powders are generally not available. The resistivity of powders produced by calcining salts is generally found to be unsatisfactorily high. Similarly little information is provided on relationships between the electrical resistivity of the crystalline solid-solution powders and individual process features or parameters characterizing the processes used for making such powders.

The object of the invention is therefore to provide a process for making a crystalline solid-solution powder, especially indiumtin-oxide powder, which has low electrical resistivity, lower than 100 $\Omega$cm, wherein the process does not include any wet-chemical process steps. The crystalline solid-solution powder obtained in this way is suitable for further processing in powder metallurgy processes without further treatments, such as annealing under reducing atmosphere. Another object is to provide a vacuum coating or sputtering target of low electrical resistivity which can impart the low resistivity properties to a thin film and to provide such a low resistivity (high conductivity film).

BRIEF DESCRIPTION

The inventive powder is achieved in that the molten material, reacted in a plasma arc in a plasma chamber, is blast-cooled at the outlet opening of the plasma chamber by a gas stream which cools the material at a cooling rate in the range of $10^5$ K/s (Kelvin per second) to $10^8$ K/s (Kelvin per second) to a temperature of between 50° C. and 400° C., producing a crystalline solid-solution powder in which electron conductive oxygen vacancies add to the electrical conductivity of the powder to produce a particularly low electrical resistivity (high conductivity) powder.

DETAILED DESCRIPTION

Figure 1:
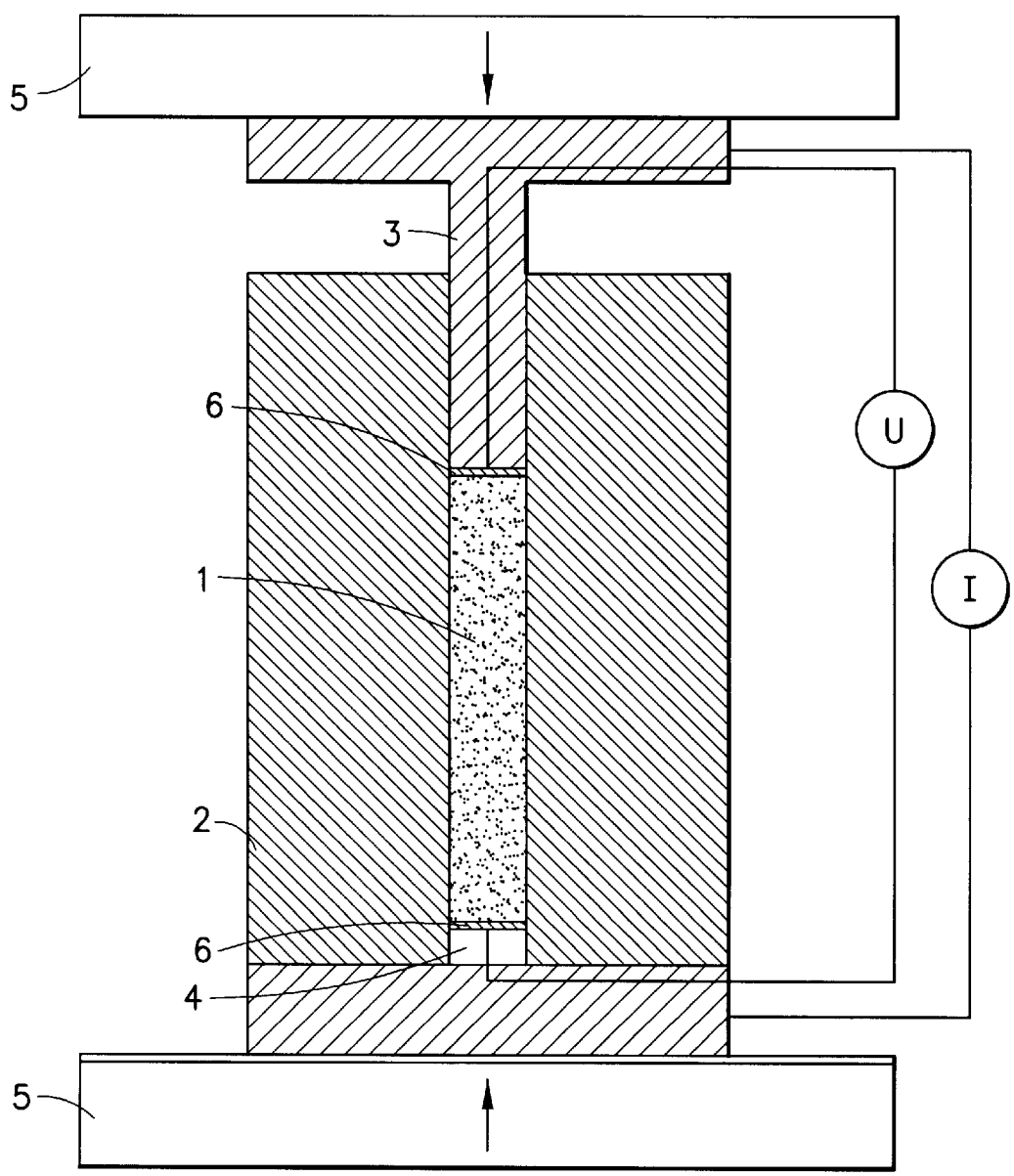
FIG. 1 illustrates a device for measuring electrical resistance of the inventive powder.

The electrical conductivity or its reciprocal, the electrical resistivity, is influenced and optimized by the following factors:

Maximization of the concentration of the electrical charge carriers by "freezing" the anion vacancies that exist in equilibrium at melting temperature.

Uniform and complete distribution, in the crystalline solid-solution lattice, of the atoms of dopant elements that contribute to mobility of the charge carriers.

High density of the crystalline solid-solution particles produced by crystallization of the fused oxide.

Further powder metallurgy processing is easily achieved with ITO-powders of high density. Compacts of these powders show also high density and relative low electrical resistivity.

The aforesaid mechanisms with respect to concentration and mobility of charge carriers that influence electrical resistivity are explained in more detail in U.S. Pat. No. 5,580,641, especially for indium-tin-oxide. Therein it is explained among other facts that the charge carriers include both the dopant Sn atoms and the oxygen vacancies. Since Sn is an element of Group IV and In an element of Group III of the periodic table, both Sn atoms and oxygen vacancies increase the concentration of excess electrons in the $In_2O_3$ crystal lattice. Since $In_2O_3$ has partly ionic and partly covalent bonding properties (whereas Si or Ge can be regarded as "classical" semiconductors with covalent IV—IV bonding), the excess electrons have high mobility. It is further shown in U.S. Pat. No. 5,580,641 that, by implantation of oxygen ions in ITO coatings, both the oxygen vacancies and the electron donors can be eliminated as charge carriers and the coatings converted largely to insulators.

The relationship between electrical resistivity and the concentration or mobility of charge carriers in undoped and tin-doped indium oxide single crystals is discussed by S. J. Wen et al., Journal of Solid State Chemistry 101, 203–210 (1992), "Electrical Properties of Pure $In_2O_3$ and Sn-Doped $In_2O_3$ Single Crystals and Ceramics". It is noted therein that the mobility of charge carriers in undoped single crystals decreases with increasing concentration. Upon doping with tin, both the concentration and mobility of the charge carriers increase, which leads to the known minimum of electrical resistance at a tin content corresponding to 10 mol % $SnO_2$. The undoped indium oxide single crystals described therein are grown at temperatures of between 1250° C. and 1300° C., and have low charge-carrier concentrations disclosed at about $1.8 \times 10^{19}$ cm$^{-3}$. Tin-doped single crystals exhibit slightly higher charge-carrier concentrations, namely disclosed at up to $2.8 \times 10^{20}$ cm$^{-3}$. According to U.S. Pat. No. 5,580,641, typical ITO coatings with a low electrical resistivity have oxygen vacancy concentrations and tin electron-donor concentrations each of about $3 \times 10^{20}$ cm$^{-3}$. (This results in a total of $9 \times 10^{20}$ cm$^{-3}$ charge carriers (i.e. electrons) based on 2 carriers from each oxygen vacancy and about 1 electron for each 10 tin atoms, as described in detail in the patent).

On the basis of these publications, it is clear that high concentrations of oxygen vacancies and electron donors in the indium oxide crystalline solid-solution lattice lead to high electrical conductivities and low specific resistance.

The present invention is based on the fact that the concentration of oxygen vacancies in an oxide solid solution can be increased when it is exposed in the solid state to the highest possible temperature and this condition is stabilized at lower temperature by rapid cooling. The highest possible temperature in this regard is defined as a temperature just below the melting point.

The above considerations apply to many metal oxides, including indium-tin-oxide, titanium oxide, zinc oxide, gallium oxide; and to other non-oxide compounds including titanium nitride and gallium nitride.

Proceeding from the above view, a process is provided for making a crystalline solid-solution powder with low electrical resistance wherein an appropriately doped metallic melt is produced by the reaction at high temperatures (e.g. a plasma arc) and then the reaction product is rapidly cooled to form a crystalline solid-solution powder which powder is characterized by both low specific resistance and commensurately high thermal conductivity. The powder has also been found to have high bulk and pressed density. The process is based on the process known from DE 195 40 379, wherein it was shown that the molten material reacted in the plasma arc at about 2000° C. to 3000° C. must be cooled at a cooling rate of greater than $10^5$ K/s upon discharge from the plasma chamber, in order to obtain a crystalline solid-solution powder with low electrical resistance, lower than 100 Ωcm.

Advantageously, the rate of cooling of the crystalline solid-solution powder is in the range between $10^6$ K/s and $10^8$ K/s. At extremely high cooling rates greater than $10^8$ K/s, however, the danger exists that the crystalline solid-solution powder will solidify not in crystalline but in amorphous form, thus creating different powder properties.

U.S. Pat. No. 5,723,027 to Bernard Serole, incorporated herein by reference, shows various plasma arc arrangements (see FIGS. 1–4 of U.S. Pat. No. 5,723,027) which can be modified for use in the present invention. Preferably an arrangement similar to that shown in FIG. 7 of U.S. Pat. No. 5,723,027 is used.

The velocity of the gas stream responsible for cooling the material is advantageously in the range between 300 m/s (meters per second) and 500 m/s (meters per second). Preferably a velocity of Mach 1 or better (supersonic) is used. The rapid expansion of the gas as it leaves the nozzle provides advantageous rapid cooling properties. Preferably the gas stream has a temperature in the range of 100 K (Kelvin) to 220 K.

It has proved expedient to use a molten indium-tin alloy as the first reactant introduced into the plasma chamber and oxygen (normally air or enriched air is used as the oxygen source) as the second reactant. With these two reactants, which react in the plasma arc and then are rapidly cooled by the process according to the invention, there is obtained an indium-tin-oxide crystalline solid-solution powder containing at least 90 vol % of crystalline solid-solution phase in the crystal lattice of indium oxide.

In the indium-tin-oxide (ITO) crystalline solid-solution powder, rapid cooling from the tin-doped indium oxide melt leads to optimum random distribution of the tin atoms at indium lattice sites in the indium oxide crystal lattice, and this, as explained hereinabove, results in low electrical resistivity of the ITO crystalline solid-solution powder.

This ITO powder, when compacted to 35 to 500 of its theoretical density, has an electrical resistivity in the range of 0.01 Ωcm to 95 Ωcm. The specific resistance is determined on the ITO powder by filling it into a simple press mold and compacting it on an uniaxial press to more than 35%, preferably to 40% of its theoretical density. During compaction, the voltage drop across the compact is measured continuously at constant current, and thereby the electrical resistivity is calculated, the top and bottom rams of the press mold being used as electrode and counter-electrode. Repeated measurement on a plurality of production batches of ITO powder has consistently confirmed the low electrical resistivity. Even as powder fill with a tap density of 2.7 g/cm$^3$, the ITO powder has a maximum electrical resistivity of 10 Ωcm.

The low electrical resistivity or the high electrical conductivity of the ITO crystalline solid-solution powder is accompanied by a commensurately high charge-carrier concentration. The charge-carrier concentration of the powder according to the invention can be estimated from electrical resistivity consideration to be in the range of $5 \times 10^{20}$ cm$^{-3}$ to $30 \times 10^{20}$ cm$^{-3}$.

Advantageously, the ITO powder has a specific surface according to the Brunauer-Emmett-Teller (BET) method of at most 3 m$^2$/g with a mean primary particle size in the range of 0.03 μm to 0.2 μm. In this connection it is noted that the combination of relatively small BET surface with similarly small primary particle size is possible only for pore-free, approximately spherical particles.

Experience with the powder also shows that it has favorable particle characteristics, which greatly improves processability compared with the ITO powders commonly available on the market. Such processability is already very apparent in powder preparation by compaction for comparative resistance measurements: ITO powder commonly available on the market initially needs a relatively high press pressure in order to achieve adequate compaction, whereas the ITO powder according to the invention can already be compacted to a degree suitable for resistance measurement merely by tapping or vibrating. The particle shape and particle-size distribution of the ITO powder according to the invention are optimally matched for processing, especially for shaping by pressing.

The invention will be explained in more detail by the following practical examples:

For the process according to the invention, it is preferable to use a system (such as shown in U.S. Pat. No. 5,723,027 at FIGS. 4 or 7) having an elongated, approximately paraboloid plasma chamber, which is provided at one of its ends with an inlet opening for the indium-tin melt (90.4 wt % In /9.6 wt % Sn) as the first reactant and for a gas stream comprising air enriched to 40 vol % oxygen as the second reactant. The two reactants react in the plasma arc, which is stabilized at the center of the tapering, paraboloid plasma chamber. The reacted material is discharged from the plasma chamber via an outlet opening disposed opposite the inlet opening, and is accelerated by means of a gas flowing in at the outlet opening via a gas-supply unit. The gas flow acting here also consists of an air stream at ambient temperature, and has a velocity of 420 m/s. Over a travel distance of 30 cm, an ITO crystalline solid-solution powder with an end temperature of about 350° C. is obtained by the gas stream. This powder is characterized by the following properties:

specific surface according to BET: 2.3 m$^2$/g;

mean primary particle size: 0.15 μm (measured by scanning electron microscope);

electrical resistivity at 40% theoretical density: 2 Ωcm.

The setup shown in FIG. 1 was used for the resistance measurement.

The ITO powder 1 was filled into a press unit 5 equipped with a die 2 and upper and lower rams 3, 4, the upper and lower rams 3, 4 travelling toward each other during the pressing process. The surfaces of upper and lower rams 3, 4 were provided with gold contacts 6, which were connected with a current sensor or measuring transducer so that the voltage drop (symbolized by U in FIG. 1) across the compacted powder specimen at constant current, represented by the symbol I in FIG. 1, could be measured continuously during compaction of ITO powder 1 in die 2. For comparison with the ITO powder according to the invention, made as in the above-mentioned example, the specific resistance of an ITO powder commonly available on the market was also determined with the setup shown in FIG. 1, and represents the expectation in the art for such powders.

Figure 2:
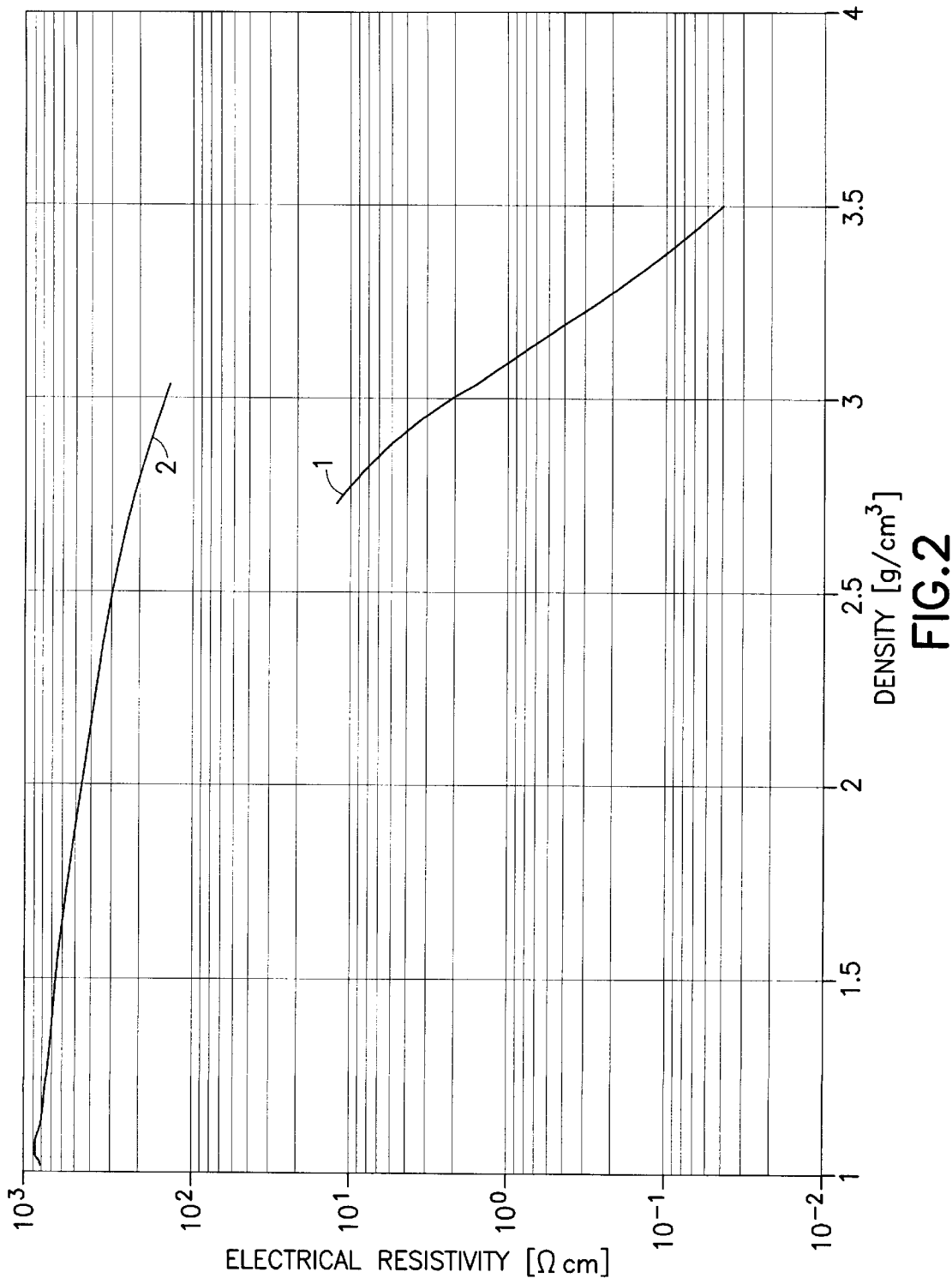
FIG. 2 shows a comparison of the electrical resistivity of the invention powder with the expectations of the art as reflected in a commercially available product.

The variation of electrical resistivity with density of the ITO powder according to the invention (curve 1) is plotted in FIG. 2 in comparison with that of an ITO powder commonly available on the market (curve 2). The values of electrical resistivity are plotted logarithmically. The reference value for the electrical resistivity is taken as the measured value at a density of 3 g/cm$^3$. For indium-tin-oxide, this corresponds to about 40% theoretical density (about 7.14 g/cm$^3$). The ITO powder according to the invention exhibits an electrical resistivity of 2 Ωcm, or in other words the specific resistance is about two orders of magnitude smaller than that of ITO powder commonly available on the market.

For further use, the ITO crystalline solid-solution powder according to the invention, characterized as described above formed by a generally usual procedure into an ITO target. More specifically, the powder was compacted under hot isostatic conditions in an evacuated stainless-steel capsule at a pressure of 50 MPa and a temperature of 970° C. for 4 hours. The "frozen" oxygen vacancies obtained as charge carriers in the ITO crystalline solid-solution powder by the production process according to the invention surprisingly continued largely to exist during this sintering process (in contrast to pressureless sintering under air atmosphere), and thus ensured a high charge-carrier concentration in the target made from the powder. The resulting target was cut as a plate (of 8 mm thickness) from the sintered block after hot isostatic compaction and used in a magnetron sputtering system to form an ITO coating. Surprisingly, even with the sputtering process, the charge carrier concentrations appeared to be maintained and an ITO coating having a charge-carrier concentration measured to be about 10×10$^{20}$ cm$^{-3}$ was deposited on a glass substrate by means using the target. The charge-carrier concentration of the ITO coating corresponded to that of the ITO crystalline solid-solution powder according to the invention. Thus, it appears that the high conductivity (low resistivity) originally imparted to the powder by special processing conditions survives sintering to an ITO target to form a target of particularly high conductivity and also survives sputtering (or vacuum deposition) to form a coating with particularly high conductivity.

It will be appreciated that the instant specification is set forth by way of illustration and not limitation, and that various modifications and changes may be made without departing from the spirit and scope of the present invention.

What is claimed is:

1. In a process for making a crystalline solid-solution powder by reacting at least two reactants in a plasma arc of a plasma chamber provided with an inlet opening for the reactants and an outlet opening with a gas-supply unit to obtain a molten material, wherein a molten metal alloy is used as the first reactant and a gas as the second reactant, the improvement wherein indium-tin alloy is used as the first reactant and oxygen as the second reactant, and the crystalline solid solution powder has an electrical resistance of less than 100 Ωcm, comprising blast-cooling the material reacted in the plasma arc at the outlet opening of the plasma chamber with a gas stream which has a velocity between 300 m/s and 500 m/s and which cools said material at a cooling rate in the range of 10$^5$ K/s to 10$^8$ K/s to a temperature of between 50° C. and 400° C., to produce a crystalline solid-solution powder containing at least 90 vol % of indium-tin-oxide crystalline solid-solution phase in a crystal lattice of indium oxide.

2. The process for making a crystalline solid-solution powder according to claim 1 wherein the gas stream for cooling said material has a velocity between Mach 1 and 500 m/s.

3. The process for making the crystalline solid-solution powder according to claim 1, wherein the cooling rate is in the range of 10$^6$ K/s to 10$^8$ K/s.

4. The process for making a crystalline solid-solution powder according to claim 1 wherein the gas stream for cooling said material has a temperature in the range of 100 K (Kelvin) to 220 K.

5. A crystalline solid-solution powder of indium-tin-oxide containing at least 90 vol % of indium-tin-oxide crystalline solid-solution phase in a crystal lattice of indium oxide, having an electrical resistivity in the range of 0.01 Ωcm to 95 Ωcm when the indium-tin-oxide crystalline solid-solution powder is compacted to 35% to 50% of its theoretical density; and having a specific surface according to the Brunauer-Emmett-Teller (BET) method of at most 3 m$^2$/g with a mean primary particle size in the range of 0.03 μm to 0.2 μm.

6. The crystalline solid-solution powder according to claim 5, having an electrical resistivity in the range of 0.01 Ωcm to 20 Ωcm when the indium-tin-oxide crystalline solid-solution powder is compacted to 40% of its theoretical density.

7. The crystalline solid-solution powder according to claim 5, having a concentration of electrical charge carriers in the range of 5×10$^{20}$ cm$^{-3}$ to 30×10$^{20}$ cm$^{-3}$.

8. The crystalline solid-solution powder according to claim 7, having a specific surface according to the Brunauer-Emmett-Teller (BET) method of at most 3 m$^2$/g with a mean primary particle size in the range of 0.03 μm to 0.2 μm.

* * * * *